United States Patent [19]
Leichliter

[11] 3,741,359
[45] June 26, 1973

[54] FLUID COUPLING
[75] Inventor: Wayne K. Leichliter, Marshall, Mich.
[73] Assignee: Eaton Corporation, Cleveland, Ohio
[22] Filed: Nov. 26, 1971
[21] Appl. No.: 202,187

[52] U.S. Cl. .............................. 192/58 B, 192/58 A
[51] Int. Cl. ............................................ F16d 35/00
[58] Field of Search ......................... 192/58 A, 58 B

[56] References Cited
UNITED STATES PATENTS
| 3,329,246 | 7/1967 | Kaplan | 192/58 B |
| 3,007,560 | 11/1961 | Weir | 192/58 B |
| 2,743,792 | 5/1956 | Ransom | 192/58 B X |
| 3,002,595 | 10/1961 | Weir | 192/58 B |
| 3,575,269 | 4/1971 | Sherman | 192/58 B |
| 1,746,148 | 2/1930 | Eaton | 192/58 A |

Primary Examiner—Allan D. Herrmann
Attorney—Yount and Tarolli

[57] ABSTRACT

A fluid coupling comprises first and second rotatable coupling members. The first coupling member defines a chamber in which the second coupling member is located. The first and second coupling members include spaced opposed surface portions defining a shear space therebetween. The spaced opposed surface portions are cooperable with a fluid shear medium within the shear space to provide a shear type fluid drive therebetween. One of the coupling members defines a reservoir chamber for the fluid shear medium. Means are provided for varying the volume of the fluid shear medium in the shear space dependent on the temperature of the fluid shear medium. The volume varying means includes a vane means on one of the coupling members which vane means defines a passage communicating the shear space with the reservoir chamber to change the volume of the fluid in the shear space dependent on the temperature of the fluid medium.

8 Claims, 6 Drawing Figures

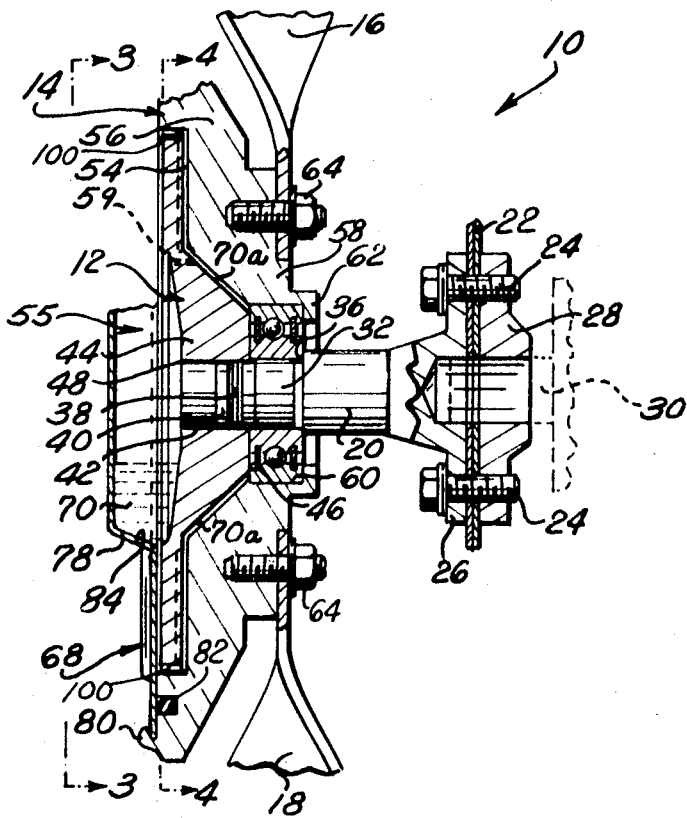

FLUID COUPLING

The present invention relates to a fluid coupling and more specifically to a fluid coupling which operates so that the relative speed of the input and output members varies dependent on the temperature of the fluid medium which transfers torque from the input member to the output member.

Viscous couplings are used for a wide variety of purposes and designs. One specific use for a viscous coupling is to drive a fan in conjunction with an internal combustion engine to thereby control the air flow through a liquid cooling radiator associated with the engine. The advantages of viscous couplings for this application are well known.

A viscous coupling for rotating a fan used in conjunction with the radiator of an internal combustion engine includes an input member which is driven by the engine. The input member and an output member have spaced opposed surface portions defining a shear space therebetween. A fluid shear medium is located within the shear space to transmit torque from the input member to the output member. The output member is connected to a fan which consequently moves air through the liquid cooling radiator upon rotation thereof. Since the output torque is provided by viscous fluid, there is a differential speed between the input and output members. Therefore, the output member and the fan always run at a lower speed than the input member.

The output torque of the coupling can be controlled by controlling the volume of fluid in the shear space. By removing a portion of the fluid from the shear space the output torque is reduced and thus the fan speed is reduced. By increasing the volume of fluid in the shear space the output torque is increased and the fan speed correspondingly increases. From the present state of the art, it is known that the ambient temperature may be sensed and used to control the volume of fluid in the shear space. Certain prior art fan clutch designs have included various complicated and expensive thermostatic devices such as bimetalic elements, wax expansion cartridges, and gas expansion bellows for this purpose.

The present invention eliminates the complicated and expensive thermostatic devices, etc. noted above, and performs the same function with pumping vanes which may be termed "temperature sensing" vanes. The vanes are provided on the output member and are spaced from a surface on the input member and define a clearance space therebetween. The vanes define a passage connecting a fluid reservoir to the shear space. Since there is always a differential speed between the input and output members and the output member operates at a lower speed than the input member, the vanes act to wipe the viscous fluid from the clearance space and thereby create the necessary pressure head on the shear fluid to force it inboard of the slower rotating output member and consequently to the reservoir. It should be understood that this pressure head must be sufficient to overcome the centrifugal force created by the rotation of the output member.

When the shear fluid is at a relatively low temperature it has a relatively high viscosity. Under such high viscosity conditions a quantity of the shear fluid is pumped out of the shear space of the fluid coupling which reduces the torque transmitting capacity of the coupling and thus reduces the speed of the output member and fan which is driven thereby. The shear fluid thus removed from the shear space flows through the vanes and into the fluid reservoir.

As the temperature of the coupling rises, the temperature of the shear fluid increases and consequently the viscosity of the shear fluid decreases. This decrease in viscosity decreases the pressure head created by the pumping action of the vanes and centrifugal force on the shear fluid overcomes the pumping action so that the shear fluid flows from the reservoir and back into the shear space. As the quantity of shear fluid in the shear space increases, the fluid coupling is capable of transmitting a greater amount of torque from the input member to the output member. Consequently the fan speed is increased to produce an increased flow rate of the air passing through the radiator.

Vanes, of course, have been widely used in viscous couplings for purposes of circulating fluid. However, no previous viscous coupling has taken advantage of a vane construction for varying the volume of shear fluid in the shear space to thereby control output speed of the viscous coupling as a substitute for a thermostatic sensor. Known previous designs without a thermostatic sensor were constructed so that on a decrease in temperature, fan speed increased and vice versa. This is contrary to desired viscous coupling operation.

Accordingly, it is an object of the present invention to provide a viscous coupling having an input and an output member with a viscous shear space therebetween and wherein the volume of fluid in the shear space is controlled with temperature changes but which has a construction which is extremely simple and uncomplicated.

It is yet another object of the present invention to provide a viscous coupling having an input and output member with spaced opposed surface portions defining a fluid shear space therebetween and wherein the volume of shear fluid in the shear space is controlled by temperature sensing vanes for pumping the shear medium from the shear space at higher viscosities of the shear medium and for allowing the fluid shear medium to flow, by centrifugal force, into the shear space at lower viscosities of the fluid shear medium.

Further objects, advantages and novel characteristics of the present invention will be apparent from the following description of the preferred embodiment made with reference to the accompanying drawings forming a part of this specification and in which:

FIG. 1 is an axial sectional view of a viscous coupling embodying the present invention;

FIG. 2 is a fragmentary sectional view of a portion of the viscous coupling shown in FIG. 1;

FIG. 5 is a fragmentary sectional view of a portion of the viscous coupling as shown in FIG. 2 and taken along line 5—5 thereof;

FIG. 6 is a partial axial sectional view of a modified form of the viscous coupling embodying the present invention.

Figure 3:
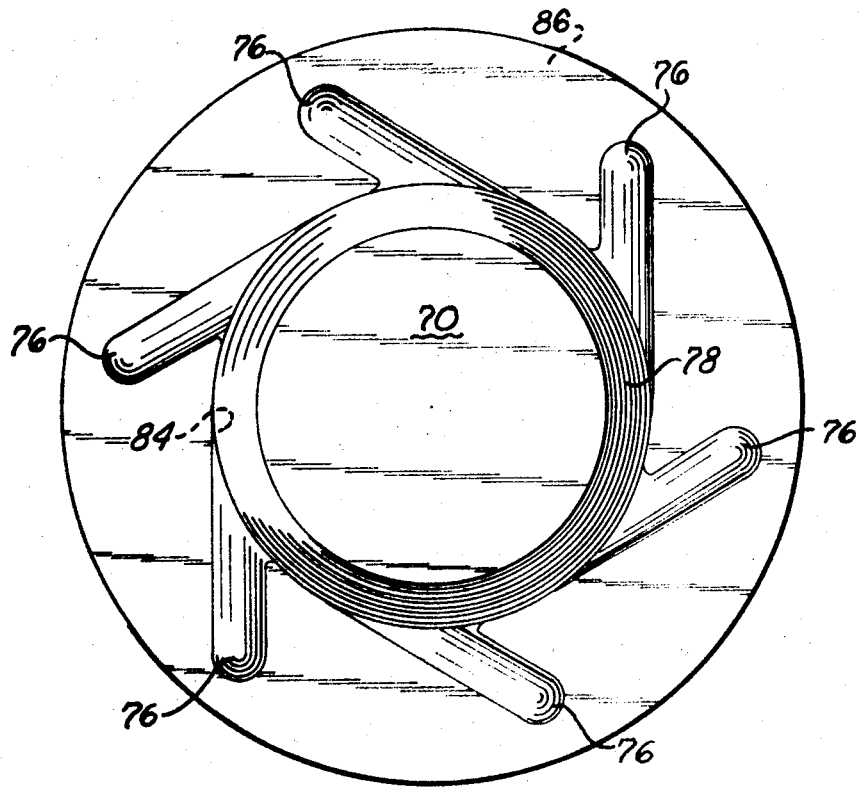
FIG. 3 is a view of a portion of the viscous coupling of FIG. 1 taken along line 3—3 thereof.

The present invention provides, in general, a viscous coupling wherein a viscous shear fluid medium cooperates with input and output coupling members to transmit torque therebetween. The volume of the fluid medium cooperating with the input and output members can be varied to vary the torque transmitted therebetween dependent on the temperature of the fluid medium. As representing a preferred embodiment of the present invention, a fluid coupling device 10 is shown in the drawings and includes an input coupling member 12 and an output coupling member 14. The coupling 10 is here shown as a drive for an engine accessory, and specifically, as a drive for a radiator cooling fan device. It is to be understood, however, that the novel construction of the preferred embodiment of the present invention is not limited in application to a fan drive, but is usuable in any application wherein the torque transmission characteristics of a fluid drive are desired along with means to vary the speed differential between the input and output members by varying the amount of the fluid medium transmitting torque between the coupling members.

Referring to the drawings more specifically, FIG. 1 shows a cooling fan engine accessory including fan blades 16, 18 which are driven from the engine through the fluid coupling 10. The fluid coupling 10 includes a input shaft 20 on which the input member 12 is non-rotatably mounted. The shaft 20 is rotatably driven by a belt drive for a pulley member 22, only a portion of the latter being shown in the drawings. The pulley member 22 is connected to the input shaft 20 at one end thereof by suitable fasteners 24 which extend through the flange portion 26 on the end of the shaft 20 and through openings in the pulley member 22. The screws 24 are threaded into a hub plate 28 located on the side of the pulley 22 opposite from the flange portion 26 and are effective to clamp the pulley 22 between the flange portion 26 and the hub plate 28. The hub plate 28 is suitably mounted on a stub shaft shown in phantom lines at 30 which stub shaft is supported by the water pump.

The input shaft 20 has intermediate its ends a reduced shaft portion 32 functioning as a support for the inner race of the ball bearing assembly 34. A shoulder 36 on the shaft 20 prevents movement of the ball bearing assembly 34 in one axial direction, namely to the right as viewed in FIG. 1. Another shaft portion 38 is provided with surface serrations and a reduced diameter portion 40 connects shaft portion 38 with a further shaft portion 42, at the end of shaft 20 opposite the end having the flange portion 26.

The rotatable input member 12 of the fluid coupling 10 is in the form of a disk having a hub portion 44 supported by the shaft 20. The hub portion 44 has an opening therethrough which has an interference fit with the shaft portion 38, 42. The hub portion 44 is pressed onto the shaft 20 until the inner surface 46 of the hub 44 abuts the side of the inner race of the ball bearing assembly 34 and thus prevents movement of the ball bearing assembly to the left, as viewed in FIG. 1. The outboard end of the shaft 20 is formed over at 48 to positively retain the input coupling member 12 on the shaft 20. From the above description it should be apparent that the rotation of the shaft 20 causes the input coupling member 12 to be rotated.

The input coupling member 12 has a shear surface 50 which is spaced opposite to the shear surface 52 of the output member 14. The spaced opposed shear surfaces 50, 52 define a shear space 54 therebetween to receive a viscous fluid therein which produces rotation of the output member 14 upon rotation of the input member 12 as will be hereinafter more fully described. The input coupling member 12 also preferably has three small holes 59, extending therethrough for a purpose to be described hereinbelow, and best seen in FIG. 4.

The output coupling member 14 is in the form of a housing defining a chamber 55. The chamber 55 is divided by the input member 12 into a reservoir chamber portion 70, and another chamber portion 70a. The output coupling member includes a main housing member 56 having a hub portion 58 with an opening 60 therethrough. The opening 60 has an interference fit with the outer race of the ball bearing assembly 34 and is supported thereby for rotation about the axis of the shaft 20. A flange portion 62 engages the right side of the outer race of the ball bearing assembly 34 as viewed from FIG. 1 and restrains the main housing member 56 from axial movement. The fan blades 16, 18 are secured to the housing member 56 by the fasteners 64 so that the fan blades rotate with the housing member.

To transmit power from the input member 12 to the output member 14 and consequently rotate the fan blades 16, 18, torque is transmitted by the shear fluid in the shear space 54. The surface 50, 52 provide opposed surfaces extending in close parallel face to face relation and define the intervening shear space 54 therebetween (as seen in FIG. 2).

Upon rotation of the input member 12 the viscous fluid in the shear space 54 transmits torque from the input member 12 to the output member 14. Specifically, the viscous fluid in the abovementioned shear space 54, transmits torque between the input and the output members 12, 14, by the shear action of the viscous fluid. When fluid fills the shear space 54, the entire shear space is utilized so that the maximum torque is transmitted from the input member to the output member 14 for a given speed of the input member. When it is desirable to operate the fan blades 16, 18 at a lower speed, fluid may be withdrawn from the shear space 54 to thereby decrease the speed at which the output member 14 rotates. It should be understood that due to the viscous shear action there is always a differential speed between the input and the output members.

The present invention provides means 68 for varying the volume of fluid shear medium in the shear space 54 dependent on the temperature of the fluid shear medium. When the ambient temperature and consequently the temperature of the fluid medium decreases, its viscosity increases and the fluid is pumped by the volume varying means 68 from the shear space 54 to a reservoir 70. When there is less fluid in the shear space 54, the speed of the output member 14 decreases (assuming the constant rotational speed of the input member 12). When the ambient temperature increases, the temperature of the viscous fluid increases while its viscosity decreases. Consequently, fluid flows into the shear space 54 from the reservoir 70 by centrifugal force to thereby increase the speed of the fan blades 16, 18. The volume varying means 68 draws fluid from the shear space 54 through passageways 72, 74 between the input member 12 and the output member 14.

The volume varying means 68, in accordance with the present invention, comprises a series of vanes, generally indicated at 76 in FIG. 3. The vanes are provided on the plate 78. The plate 78 is secured to the housing member 56 by rolling a lip 80 of the housing member 56 over the peripheral edge of the plate 78 and sealing movement of fluid past the plate 78 with a sealing ring 82. The housing member 56 and plate 78 provide a chamber in which the input member 12 is located.

The vanes 76 are formed in the plate 78 and extend tangentially from the circumferential edge 84 of the reservoir 70 to a position adjacent to the space 74. As seen in FIG. 3, a plurality of the vanes 76 are spaced around the member 78. The surface of 86 of the member 78 is positioned adjacent to the surface 88 of the input member 12 as shown in FIG. 2. The vanes 76 are formed in the member 78 so that they extend from the space 87 between the surfaces 86, 88. The vanes 76 are formed in the member 78 as a groove therein to pump fluid from the space 74 to the reservoir 70.

The invention disclosed herein operates on the principle that the viscous fluid decreases in viscosity with an increase in the temperature thereof. The vanes 76 in the output member 14 act as scoops to pump the viscous fluid inboard toward the reservoir 70 due to a proper clearance existing between the surface 88 of the input member 12 with respect to the surface 86 of the output member 14 and when sufficient differential speed between the input and the output members 12, 14 respectively, is maintained. The vanes 76 act to wipe the fluid from the clearance space 87 defined by the surfaces 86, 88 and the differential speed of the input and output members 12, 14 creates the necessary head on the viscous fluid to force it radially inwardly through the vanes. As the viscosity of the viscous fluid increases, the greater the quantity of fluid pumped out of the shear space 54 to consequently decrease the speed of the output member 14 and consequently decrease speed of the fan blades 16, 18 driven thereby.

It should be understood that the vanes 76 may be formed in the member 76 in positions other than tangential to the circumference 84 of the reservoir 70, such as at any angle between straight radial grooves and reverse radial grooves and may be various widths.

As the temperature of the viscous fluid increases and viscosity decreases, it is desirable to increase fan speed. Since the reservoir 70 and input and output members 12, 14 are rotating and the pumping action of the vanes 76 on the viscous fluid between the surface 86, 88 decreases due to the decrease in viscosity, the centrifugal force acting on the fluid forces the fluid to flow from the reservoir 70 to the shear space 54. The centrifugal force acting on the viscous fluid is created by the rotation of the reservoir 70, and urges the viscous fluid radially outwardly. It should be understood that when the vanes 76 act to pump fluid from the shear space 54 to the reservoir 70, a sufficient pressure head is created to overcome the centrifugal force on the viscous fluid.

When the viscous coupling is in an at-rest condition, the viscous shear medium is located as indicated in FIG. 1 and fills up substantially the lower portion of the chamber 55. AS the input member 12 of the viscous coupling 10 begins rotation, the shear fluid is dragged around the periphery of the input member 12 and in addition, contrifugal force causes the fluid to move radially outwardly and be located in the shear space around the periphery of the chamber 55. The action of the pumping vanes 76, as described above, causes fluid to flow from the shear space 54 through the spaces 72, 74 and through the vanes 76 into the reservoir chamber 70. This results in a net decrease in the fluid in the shear space 54 due to the fact that the input member 12 divides the chamber 55 into the two chamber portions 70 and 70a. When the fluid is directed into the chamber portion 70, the viscosity is high, and the fluid cannot flow therefrom into the chamber portion 70a by way of passageway 87, and little or no fluid will flow from chamber portion 70 through the three holes 59 through clutch member 12 which communicate chambers 70 and 70a. The flow of fluid from the chamber 70 back into the viscous shear chamber 54 is effected, as noted above, by the centrifugal force acting on the fluid in opposition to the action of the vanes 76, and the flow is generally through the space 87 from the reservoir 70 and into the shear space 54. Since the viscous fluid must decrease in viscosity before centrifugal force can overcome the pumping action of the vanes, this decreased fluid viscosity will also more easily pass through the three communication holes 59 in input member 12 between chamber portions 70 and 70a, and assist the centrifugal action on the fluid which flows through the vanes 76 back into the shear space 54. The holes 59 are not intended to continuously bleed fluid to chamber 70a but are designed to assist clutch engagements. The holes, if used, are made small so as to be viscosity sensitive and function to direct fluid therethrough when the viscosity decreases to a predetermined degree.

As a result of the above, it should be clear that the pumping vanes 76 effect a flow of fluid from the shear space 54 into the reservoir 70 causing a net reduction in the volume of fluid in the shear space 54 and that centrifugal force acting on the fluid in the reservoir effects the flow of fluid from the reservoir 70 back into the shear space 54. It is believed that during the flow of fluid from the reservoir 70 into the shear space 54 there still may be some amount of fluid flowing through the vanes 76 into the reservoir 70 due to the pumping action thereof. However, there is a net increase in fluid flow from the reservoir 70 into the shear space 54. Accordingly, it should be apparent that the vanes 76 act as pumping elements to vary the volume of the fluid in the shear space 54, and function as temperature-sensing vanes by sensing of fluid temperature by fluid viscosity change and thereby controlling the flow of fluid into and from a shear space.

Figure 4:
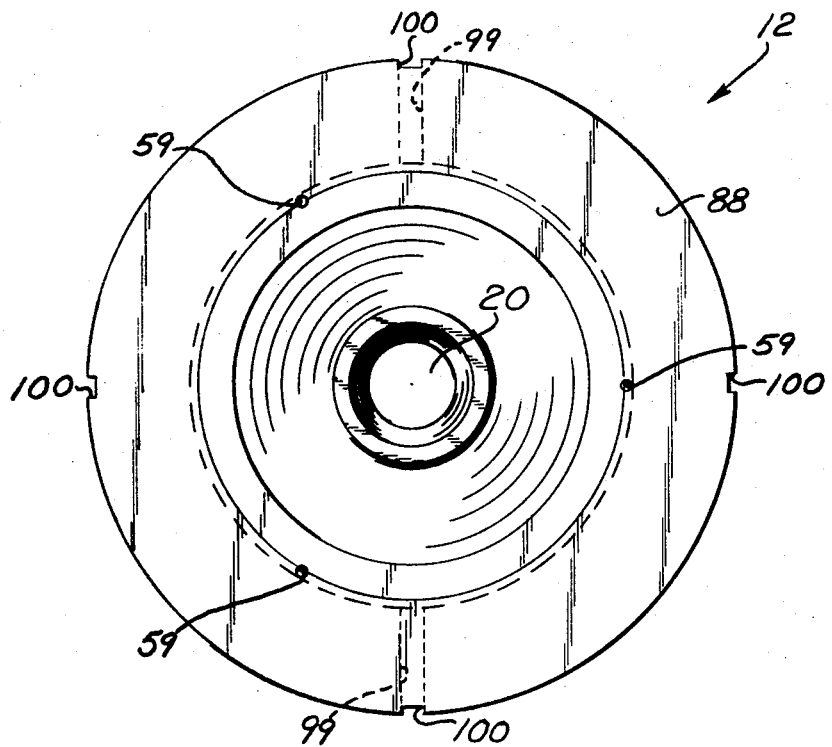
FIG. 4 is a view of a portion of the viscous coupling of FIG. 1 taken along the line 4—4 thereof.

To decrease the time required for the fluid to return to the shear space 54, radially extending grooves 99 (FIG. 4) are provided in the member 12, and specifically in the surface thereof defining shear space 54. The radial grooves extend between the reservoir 70a and the passage 74 and direct fluid therethrough. Four grooves 100 in the periphery of member 12 and across passageway 74 extend between the chamber space 87 and passageway 72 and act to increase the size of passageway 74. As shown in FIG. 4, two diametrically opposite grooves 100 communicate with the radial grooves 99.

It should be noted that the vanes 76 act to change the volume of the fluid in the shear space 54 to thereby change the speed of the output member 14 dependent on the temperature of the fluid. The vanes 76 act much the same as the temperature sensing devices known in the art to vary the volume of shear fluid in the shear space, and accordingly may be termed temperature-sensing vanes.

A modified design of the present invention is shown in FIG. 6. The viscous coupling 101 operates in a manner similar to the coupling 10 shown in FIGS. 1–4 and includes an input member 102 and an output member 104. The input member 102 includes a housing member 106 and a plate 108 secured thereto by means of a lip 110 as described in connection with the housing member 56 and plate 78 hereinabove. The output member is located in a chamber 124 defined by the input member 102. The input member 102 and output member 104 have spaced opposed surface portions 114, 116 defining a shear space 112 therebetween and cooperable with a fluid shear medium within the shear space 112 to provide a shear type fluid drive between the input member 102 and output member 104. The input member 102 and the output member 104 define a reservoir chamber 118 therebetween for storing fluid shear medium.

Means 120 are provided for varying the volume of the fluid shear medium in the shear space 112 dependent on the temperature of the fluid shear medium. The volume varying means 120 includes a plurality of vanes 122 on the output member 104 which defines passages communicating the shear space 112 and reservoir 118 as hereinabove described in connection with the vanes 76. The vanes 122 are operable to pump fluid from the shear space 112 into the reservoir 118 when the viscous fluid is at lower temperatures and consequently the viscosity thereof is increased. The pumping action of the vanes 122 is similar to that described in connection with the vanes 76 described in the embodiment shown in FIGS. 1–4.

From the above, it should be apparent that applicant has made a substantial improvement in the viscous coupling art, and has eliminated complicated temperature sensing mechanisms for controlling output speed and has substituted a simple vane construction.

What is claimed is:

1. A fluid coupling comprising relatively rotatable first and second coupling members, said first coupling member defining a chamber in which said second coupling member is located, said first and second coupling members having spaced opposed surface portions defining a shear space therebetween and cooperable with a fluid shear medium within said shear space to provide a shear-type fluid drive therebetween, one of said coupling members defining a reservoir chamber for the fluid shear medium, and means for varying the volume of the fluid shear medium in the shear space dependent on the temperature of the fluid shear medium comprising means on one of said coupling members defining at least one pumping groove communicating said shear space with said reservoir chamber and operable to pump fluid from said shear space into said reservoir chamber to decrease the volume of fluid in the shear space when the fluid viscosity is within a predetermined range, said coupling members being rotatable in the same direction at different rotational speeds, said pumping groove being located on the slower of said coupling members and creating a pressure head on the viscous fluid to urge the fluid from the shear space toward said reservoir chamber when the viscosity is within the predetermined range due to a relatively low ambient temperature.

2. A fluid coupling as defined in claim 1 wherein the flow of fluid from said reservoir chamber into the shear space is effected by centrifugal force acting on the fluid.

3. A fluid coupling as defined in claim 1 wherein the slower of said coupling members is the output member which is driven by the other of said coupling members.

4. A fluid coupling as defined in claim 1 wherein said volume varying means pumps fluid from said shear space with a pressure head which increases as the temperature of tehe fluid decreases and which pressure head decreases as the temperature of the fluid increases.

5. A fluid coupling as defined in claim 1 wherein a surface is provided adjacent to said vane means on said one coupling mamber which is spaced from an adjacent surface of the other coupling member and through which the fluid flows from the reservoir into the shear space.

6. A fluid coupling as defined in claim 1 wherein said one coupling member defines a chamber and said other coupling member is located in said chamber and divides said chamber into two chamber portions, one of said chamber portions comprising a reservoir chamber and being in communication with the other chamber portion through said vane means, and passage means in said other coupling member for directing fluid from said reservoir chamber into said shear space upon a decrease in viscosity of the fluid to a predetermined level.

7. A fluid coupling comprising relatively rotatable first and second coupling members, said first coupling member defining a chamber in which said second coupling member is located, said second coupling member dividing said chamber into two chamber portions, said first and second coupling members having spaced opposed surface portions defining a shear space therebetween and cooperable with a fluid shear medium within said shear space to provide a shear-type fluid drive therebetween, one of said chamber portions comprising a reservoir chamber for the fluid shear medium, means for varying the volume of the fluid shear medium in the shear space dependent on the temperature of the fluid shear medium comprising vane means on one of said coupling members defining a passage communicating said shear space with said reservoir chamber and operable to pump fluid from said shear space into said reservoir chamber to decrease the volume of fluid in the shear space, means on said second coupling member isolating said two chamber portions from free flow of fluid therebetween to thereby provide for said decrease in volume of fluid in the shear space, and surfaces of said first and second coupling members defining a passage for fluid flow from the reservoir chamber into said shear space due to centrifugal force acting in opposition to the action of said vane means to increase the volume of fluid in said shear space.

8. A fluid coupling as defined in claim 7 wherein said vane means comprises a series of vane formed in the output coupling member and which extend angularly so as not to intersect the axis of rotation of the coupling members.

* * * * *